United States Patent
Peng et al.

(10) Patent No.: US 9,215,605 B2
(45) Date of Patent: Dec. 15, 2015

(54) METHOD FOR ESTIMATING FREQUENCY DIFFERENCE

(71) Applicant: MStar Semiconductor, Inc., Hsinchu County (TW)

(72) Inventors: Chi-Yuan Peng, Taipei (TW); Chun-Jung Wu, Tainan (TW); Huan-Hsiu Tseng, Hsinchu County (TW); Ping-Hung Chiang, Hsinchu County (TW); Yu-Tai Chang, Hsinchu (TW); Francesc Boixadera, Cambridge (GB)

(73) Assignee: MSTAR SEMICONDUCTOR, INC., Hsinchu County (TW)

( * ) Notice: Subject to any disclaimer, the term of this patent is extended or adjusted under 35 U.S.C. 154(b) by 359 days.

(21) Appl. No.: 13/845,264

(22) Filed: Mar. 18, 2013

(65) Prior Publication Data
US 2014/0073315 A1    Mar. 13, 2014

(30) Foreign Application Priority Data
Sep. 7, 2012  (TW) .............................. 101132667 A (51) Int. Cl.
*H04W 24/02* (2009.01)
*H04W 56/00* (2009.01)

(52) U.S. Cl.
CPC .......... *H04W 24/02* (2013.01); *H04W 56/0035* (2013.01)

(58) Field of Classification Search
CPC ........................... H04W 24/02; H04W 56/0035
USPC .................................................. 455/423–425
See application file for complete search history.

(56) References Cited

U.S. PATENT DOCUMENTS 6,801,567 B1    10/2004  Schmidl et al.
2003/0219066 A1*  11/2003  Abraham et al. ............. 375/150

OTHER PUBLICATIONS

U.S. Appl. No. 13/786,499.

* cited by examiner

*Primary Examiner* — Vladimir Magloire
*Assistant Examiner* — Erica Navar
(74) *Attorney, Agent, or Firm* — WPAT, PC; Justin King (57) ABSTRACT

A method for estimating a frequency difference between a transmission terminal and a reception terminal according to a reception signal is provided. The method includes steps of: in a first period, receiving and storing a first part of the reception signal; in a second period, frequency shifting the first part of the reception signal according to an L number of sweep frequencies, and correspondingly obtaining multiple first part correlation results, where L is a positive integer; in the second period, receiving and storing a second part of the reception signal; in a third period, frequency shifting the second part of the reception signal according to the L number of sweep frequencies, and correspondingly obtaining multiple second part correlation results; and estimating the frequency difference according to the first and second part correlation results.

5 Claims, 10 Drawing Sheets

| | Processing time | Storage space |
|---|---|---|
| FIG. 1 | ΔT*L | 0 |
| FIG. 3 | △T+△S | N*5120*(8+8) |

| Signal buffer (Part of reception signal) | |
|---|---|
| First-part reception signal G1 | Slot 1 |
| | Slot 2 |
| | Slot 3 |
| | Slot 4 |
| | Slot 5 |
| | Slot 6 |

FIG. 5B

| Calculation result buffer (Correlation result) |
|---|
| First part correlation result Cor_g1 |

FIG. 5C

| Calculation result buffer (Correlation result) |
|---|
| First part correlation result Cor_g1 |
| Second part correlation result Cor_g2 |
| Third part correlation result Cor_g3 |
| Fourth part correlation result Cor_g4 |
| Fifth part correlation result Cor_g5 |
| Sixth part correlation result Cor_g6 |
| Seventh part correlation result Cor_g7 |
| Eighth part correlation result Cor_g8 |

METHOD FOR ESTIMATING FREQUENCY DIFFERENCE

This application claims the benefit of Taiwan application Serial No. 101132667, filed Sep. 7, 2012, the subject matter of which is incorporated herein by reference.

BACKGROUND OF THE INVENTION

1. Field of the Invention

The invention relates in general to a method for estimating a frequency difference, and more particularly to a method for estimating a frequency difference according to correlation results.

2. Description of the Related Art

Wideband Code Division Multiple Access (WCDMA) is a digital third-generation mobile communication technology. In a WCDMA system, before a transmitter (a base station) transmits data, narrowband signals are first spread to broadband signals through spread spectrum coding and scrambled through scramble coding, and are then transmitted to a receiver (a cell phone). The data is in a unit of bits, and a spread sequence is in a unit of chips. As the chip rate during the transmission process in the WCMDA system is 3.84 Mcps, an actual bandwidth utilized by the WCMDA system is 3.84 MHz.

To allow the receiver to restore baseband signals transmitted by the transmitter, the cell phone first needs to synchronize with the base station, or else the baseband signals may not be properly restored by the cell phone due to unsynchronized timings of the receiver and the transmitter.

Figure 1:
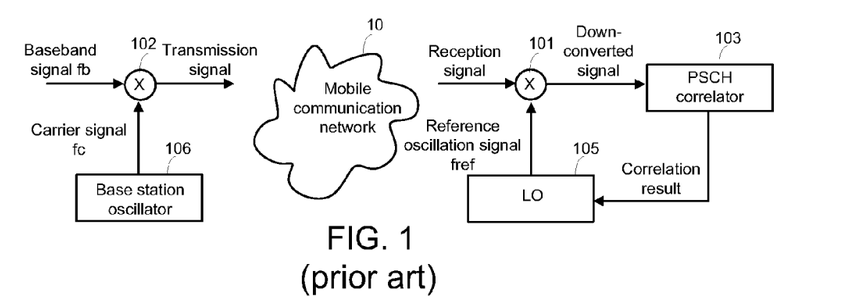
FIG. 1 is a schematic diagram of signal processing of a transmitter and a receiver in a WCDMA system.

FIG. 1 shows schematic diagram of signal processing of a transmitter and a receiver in a WCDMA system. The left of the diagram shows a signal process at a base station, and the right of the diagram shows a signal process at a cell phone.

At the transmitter, a base station oscillator 106 generates a carrier signal. The baseband signal is up-converted through the carrier signal by a mixer 102 to generate a transmission signal. For identification purposes, in the description below, $f_b$ represents a frequency of the baseband signal, and $f_c$ represents a frequency of the carrier signal.

After the baseband signal having the frequency $f_b$ passes through the mixer 102, a mixed signal having a frequency $f_b \pm f_c$ is generated. Through a filter (not shown), the frequency $f_b + f_c$ or $f_b - f_c$ of the mixed signal is selected as the frequency of a transmission signal. The transmission signal is transmitted from an antenna of the base station via a mobile communication network 10 and then received by an antenna of the cell phone.

When the transmission signal is received as a reception signal by the cell phone, a mixer 101 of the cell phone frequency shifts the reception signal by use of a reference oscillation signal generated by a local oscillator 105.

Theoretically, a frequency $f_{ref}$ of the reference oscillation signal equals the frequency $f_c$ of the carrier signal, and so the baseband signal can be restored in intact from the reception signal. However, quite the contrary, the reception signal obtained after frequency shifting by use of the reference oscillation signal is different from the baseband signal initially transmitted from the transmitter. Apart from noises in the transmission process, the frequency $f_{ref}$ of the reference oscillation signal is not entirely the same as the frequency $f_c$ of the carrier signal generated by the oscillator of the base station, and so a frequency difference $f_{error}$ ($f_{error}=f_{ref}-f_c$) exists between the two. The frequency difference $f_{error}$ affects data contents obtained from demodulation at the cell phone.

According to WCDMA specifications, all base stations employ the same primary synchronization channel (PSCH) sequence, which is also pre-stored at the cell phone. In general, the receiver utilizes a PSCH correlator 103 to perform a correlation calculation on the PSCH sequence in the frequency-shifted signal to estimate the frequency difference according to the correlation result. Details of the PSCH correlator 103 are described with reference to FIGS. 2A and 2B shortly.

To determine the frequency difference $f_{error}$ between the reference oscillation signal and the carrier signal, approaches for correcting the frequency of the reference oscillation signal are categorized into coarse correction and fine correction.

The coarse frequency correction is to reduce the frequency difference $f_{error}$ to t within a frequency sweep step $\Delta f$ by performing an initial correction on the frequency $f_{ref}$ of the reference oscillation signal. After performing the coarse correction, a fine correction is performed on the frequency $f_{ref}$ of the reference oscillation signal. The coarse frequency correction shall be discussed below.

Figures 2A, 2B:
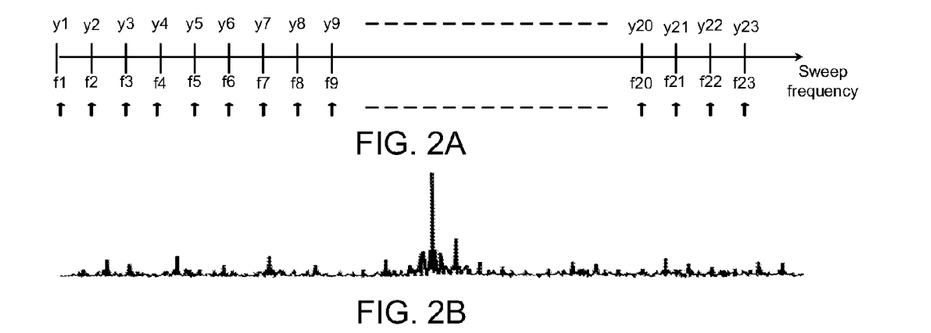
FIG. 2A is a schematic diagram of a frequency sweep range being divided into a plurality of sweep frequencies, with every two sweep frequencies spaced by a frequency scan step, and accordingly estimating a frequency difference.
FIG. 2B is a schematic diagram of acquiring the maximum value from the correlation results.

Referring to FIG. 2A, a frequency sweep range is divided into a plurality of sweep frequencies $f_i$, with every two sweep frequencies being spaced apart by a frequency sweep step. The frequency difference can be accordingly estimated.

As previously stated, the PSCH sequence is provided in advance by the WCDMA system. Thus, the known PSCH sequence is employed for estimating the frequency difference $f_{error}$ between the frequency at the receiver (the frequency $f_{ref}$ of the reference oscillation signal) and the frequency at the transmitter (the frequency $f_c$ of the carrier signal).

With a correlation calculation performed by a PSCH correlator, a value of the correlation result gets larger as the frequency difference between the frequency $f_{ref}$ of the reference oscillation signal and the frequency $f_c$ of the carrier signal decreases. In contrast, the value of the correlation result gets smaller as the frequency difference between the frequency $f_{ref}$ of the reference oscillation signal and the frequency $f_c$ of the carrier signal increases. Therefore, the receiver corrects the frequency $f_{ref}$ of the reference oscillation signal generated by a local oscillator 105 by employing such characteristic and thus achieves the coarse frequency correction.

As shown in FIG. 2A, in a conventional approach for coarse frequency correction, a frequency sweep range is divided into multiple different sweep frequencies, and the sweep frequencies are sequentially utilized as the reference oscillation signal $f_{ref}$ and tested.

It is assumed that the frequency sweep range is divided into 23 sweep frequencies, which are denoted by different numbers. That is, the sweep frequency $f_i$ represents an $i^{th}$ sweep frequency in the frequency sweep range. Besides, correlation results obtained from the reception signal which coordinating with the sweep frequencies and calculated by the PSCH correlator 103 are also numbered according to the corresponding sweep frequencies.

For example, a first correlation result y1 is obtained according to a first sweep frequency $f_1$, a second correlation result y2 is obtained according to a second sweep frequency $f_2$, and so forth.

Between every two sweep frequencies $f_i$ of the frequency sweep range is a predetermined frequency sweep step $\Delta f$. Selections regarding the frequency sweep range, the sweep frequency and the frequency sweep step may vary according to actual cell phone applications and system planning. Thus, only principles of the approach shall be discussed, whereas actual values selected and details of definitions shall be omitted.

After obtaining the correlation results $y_i$ according to the sweep frequencies $f_i$ in the frequency sweep range, a maximum correlation result $y_{max}$ can be obtained by comparing all the correlation results $y_i$.

Further, when the correlation result $y_i$ is the maximum value, the corresponding sweep frequency $f_i$ renders the frequency difference $f_{error}$ to be a minimum value possibly yielded by the coarse frequency correction.

FIG. 2B shows a schematic diagram of acquiring the maximum value from the correlation results. After receiving the reception signal via the antenna, the reception signal is sampled and a correlation calculation is performed on the sampled data. In a conventional approach, a correlation calculation is performed on each of the sweep frequencies so that a corresponding peak value is obtained for each of the sweep frequencies.

By performing the correlation calculation on the sweep frequencies in FIG. 2A and recording peak values correspondingly calculated from the sweep frequencies, a waveform as shown in FIG. 2B is obtained. Assuming that the maximum value $y_{max}$ corresponds to $f_{13}$, it is estimated that the correlation result has a maximum value when the sweep frequency is approximately $f_i = f_{13}$.

As previously stated, the value of the correlation result is the largest when the frequency difference between the sweep frequency and the frequency of the carrier signal is the smallest, and the value of the correlation result gets smaller as the frequency difference increases. That is, according to the waveform in FIG. 2B, it can be deduced that, the frequency $f_{ref}$ of the reference oscillation signal is most approximate to the frequency $f_c$ of the carrier signal when the frequency $f_{ref}$ of the reference oscillation signal is the $13^{th}$ sweep frequency $f_{13}$.

Accordingly, in a conventional approach, the reference oscillation signal generated by the local oscillator 107 is corrected to the sweep frequency $f_{ref} = f_{13}$ corresponding to the maximum correlation result.

In summary, in the above conventional approach, different sweep frequencies in a frequency sweep range are attempted as the frequency $f_{ref}$ of the reference oscillation signal, and the sweep frequency corresponding to the maximum correlation result is identified therefrom. Such approach of testing and verifying the change in the sweep frequency $f_i$ one after another is utilized for coarse frequency correction of the reference oscillation signal.

Figure 2C:
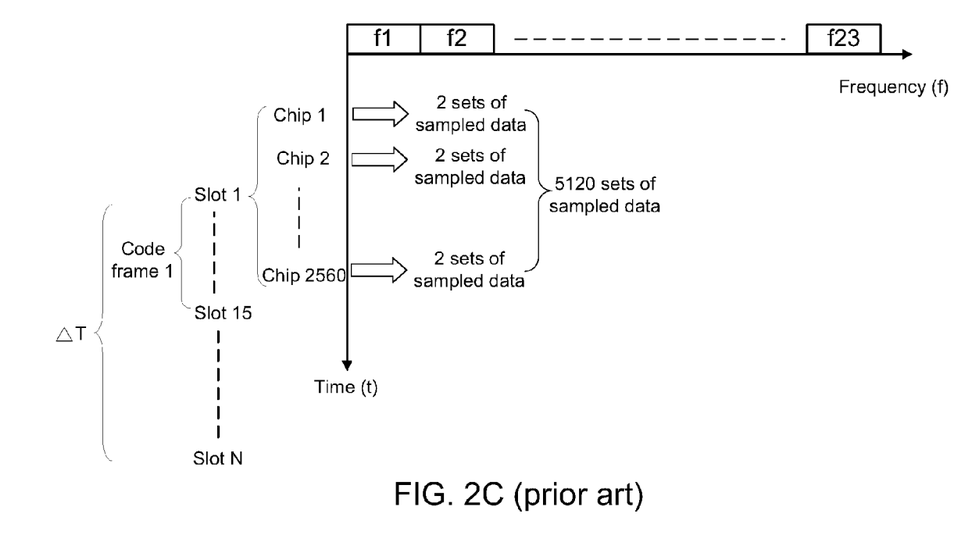
FIG. 2C is a schematic diagram of estimating a frequency difference according to two axes of time and frequency in the prior art.

FIG. 2C shows a schematic diagram of estimating a frequency difference according to two axes of time and frequency in the prior art.

According to WCDMA definitions, a signal is transmitted in a unit of frames having a length of 10 ms, with each frame having 15 slots. The slots of each frame are numbered from 1 to 15. Each of the slots contains 2560 chips. For example, slot 1 has chips 1 to 2560.

It is known from the above descriptions that, the frequency of the mixer needs to be repeatedly adjusted when sequentially utilizing different sweep frequencies as the frequency of the reference oscillation signal. A new receptions signal is then received by the antenna, followed by performing the correlation calculation using another sweep frequency. As the range of the frequency sweep range gets broader and the length of the reception signal gets longer, not only the number of attempts utilizing the reception signal becomes larger but also the process of the correlation calculation becomes longer.

Assuming that 23 sweep frequencies (f1, f2, . . . , and f23) are provided during the correction process, each set of sampled data is required to undergo 23 times of correlation calculation.

According to sampling principles, the sampled data needs to be at least twice of each chip. Since each slot includes 2560 chips, at least 5120 sets of sampled data are required based on the above sampling principles.

Moreover, tests utilizing 23 sweep frequencies need to be carried out for each set of the sampled data. It means that, for a reception signal having a length of one slot, 5120*23 times of correlation calculation are required.

However, the reception signal of one slot is insufficient for estimating the frequency difference. For example, to use 48 slots, 48*5120*23 times of correlation calculation are required. That is to say, in the above conventional approach, the times of correlation calculation significantly expands as the number of slots utilized increases.

Therefore, assuming that the reception signal required for the frequency correction is $\Delta T$, the time for processing the reception signal is negligible and an L number of sweep frequencies are sequentially scanned in turn, the above approach needs a processing time of substantially $\Delta T*L$. It can be concluded that, the above approach of repeatedly performing the correlation calculation is rather inefficient. Further, in situations of a fresh boot, out of system services and searching for a network in a background during roaming, the above approach consumes an immense amount of power during the process of cell search of the cell phone.

Figure 3:
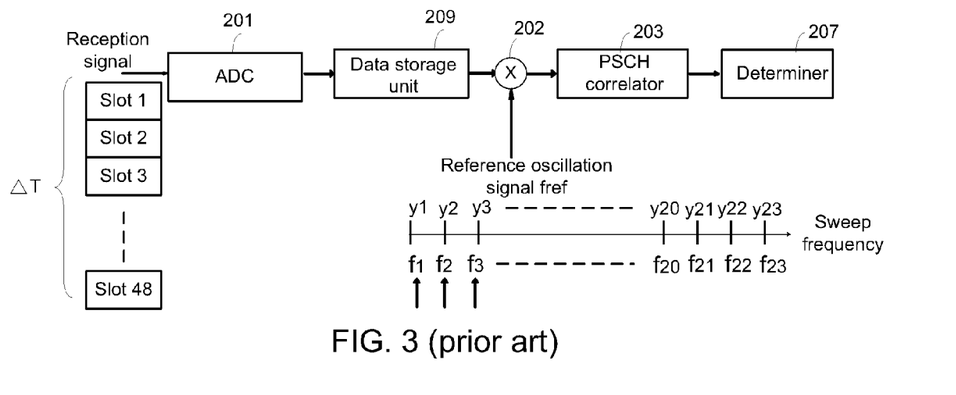
FIG. 3 is a schematic diagram of an accelerated frequency difference estimation of the prior art.

FIG. 3 shows a schematic diagram of an accelerated frequency difference estimation of the prior art. In simple, a reception signal is first converted to a digital format and stored in a memory, and the digitized data stored in the memory is then frequency-shifted by a digital approach.

An analog-to-digital converter (ADC) 201 first converts a reception signal from an analog format to a digital format. The reception signal in a digital format is then stored by a data storage unit 209.

Since the reception signal is stored in the data storage unit 209 in a digital format, frequency shifting and correlation calculation may be directly performed on the reception signal in a digital format by a digital approach in subsequent operations. That is to say, in FIG. 3B, a mixer 202 for frequency shifting, a PSCH correlator 203, a weighted accumulation calculation 205, and a determiner 207 are practiced in a digital domain.

Similarly, it is assumed that, to estimate the frequency difference of a reception signal having a length of 48 slots utilizing 23 sweep frequencies, a time length of 48 slots is needed for storing the reception signal. Without repeated reception processes of the base station, 48*5120*23 times of the subsequent correlation calculation are performed in the cell phone, so that the required time is considerably reduced.

For an N number of slots, assuming that the total time spent on the frequency shifting and correlation calculation is $\Delta S$, the total time required by the approach in FIG. 3 is substantially $\Delta T + \Delta S$.

With the conventional solution implemented by a digital approach shown in FIG. 3, as the frequency shifting, PSCH correlation calculation, weighted accumulation calculation and frequency difference estimation are all performed in the digital domain, an overall processing time is remarkably reduced.

However, although the above approach of record-and-replay offers a reduced time of frequency difference estimation, a data storage unit 209 having a huge capacity is required at the receiver.

Taking a reception signal having a length of 48 slots for example, a total of 48*5120 sets of sampled data need to be recorded. When processing the sampled data, the sampled data are divided into an I-branch and a Q-branch. Assuming that either of the I-branch and Q-branch is 8-bit in length, the data storage unit 209 demands a buffer size of 48*5128*(8+8) bits.

Further, the above approach, before repeatedly playing different sweep frequencies, needs to record the frequency-shifted signals (i.e., initial frequency-shifted signals) generated from frequency shifting the reference oscillation signal into a buffer. In addition, to yield even more accurate frequency difference estimation, the approach in FIG. 3 also demands a storage unit 209 having an even larger capacity. Thus, although such approach accelerates the processing speed, hardware costs may be greatly increased by the memory space for storing the additional chips.

Figure 4:
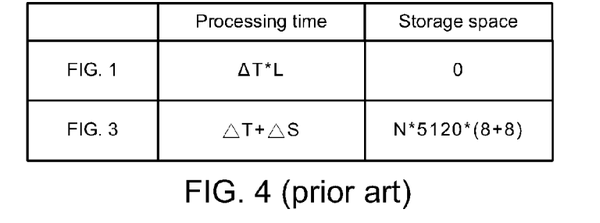
FIG. 4 is a schematic diagram of processing time and storage space required for both of the above conventional solutions.

FIG. 4 shows a schematic diagram of processing time and storage space required for both of the above conventional solutions. From FIG. 4, the architecture in FIG. 1 consumes an enormous processing time although no additional storage spaces is required. In contrast, the architecture in FIG. 3B requires a greatly increased storage space despite that the processing time is shorter compared to that of FIG. 1.

From the above descriptions of the prior art, it is concluded that, the conventional approaches either needs a lengthy processing time or a storage space having an enormous capacity. Therefore, there is a need for a solution that satisfies both processing time and hardware cost requirements.

SUMMARY OF THE INVENTION

According to an aspect of the present invention, a method for estimating a frequency difference between a transmitting terminal and a receiving terminal according to a reception signal is provided. The method includes steps of: in a first period, receiving and storing a first part of the reception signal; in a second period, frequency shifting the first part of the reception signal according to an L number of sweep frequencies to obtain a plurality of first part frequency-shifted signals corresponding to the L number of sweep frequencies, where L is a positive integer; performing a correlation calculation on the first part frequency-shifted signals to obtain a plurality of first part correlation results; in the second period, receiving and storing a second part of the reception signal; in a third period, frequency shifting the second part of the reception signal according to the L number of sweep frequencies to obtain a plurality of second part frequency-shifted signals corresponding to the L number of sweep frequencies; performing the correlation calculation on the second part frequency-shifted signals to obtain a plurality of second part correlation results; and estimating the frequency difference according to the first part correlation results and the second part correlation results.

According to another aspect of the present invention, an apparatus for estimating a frequency difference between a transmitting terminal and a receiving terminal according to a reception signal is provided. The apparatus includes: a storage unit, for storing a first part of the reception signal in a first period, and storing a second part of the reception signal in a second period; a mixer, for frequency shifting the first part of the reception signal according to an L number of sweep frequencies in the second period to obtain a plurality of first part frequency-shifted signals corresponding to the L number of sweep frequencies, and frequency shifting the second part of the reception signal according to the L number of sweep frequencies in a third period to obtain a plurality of second part frequency-shifted signals corresponding to the L number of sweep frequencies; a synchronization channel correlator, coupled to the mixer, for performing a correlation calculation on the first part frequency-shifted signals to obtain a plurality of first part correlation results, and performing the correlation calculation on the second part frequency-shifted signals to obtain a plurality of second part correlation results; and a determiner, for estimating the frequency difference according to the first correlation results and the second correlation results.

The above and other aspects of the invention will become better understood with regard to the following detailed description of the preferred but non-limiting embodiments. The following description is made with reference to the accompanying drawings.

DETAILED DESCRIPTION OF THE INVENTION

A method for estimating a frequency difference and capable of satisfying both processing time and storage space requirements is provided according to a preferred embodiment of the present invention. In the preferred embodiments below, an example of a reception signal having a length of 48 slots cooperating with 23 sweep frequencies is taken as an example for explaining the method for estimating a frequency difference. It should be noted that, in actual applications, the numbers of slots and sweep frequencies are not limited to the exemplary values.

Figure 5A:
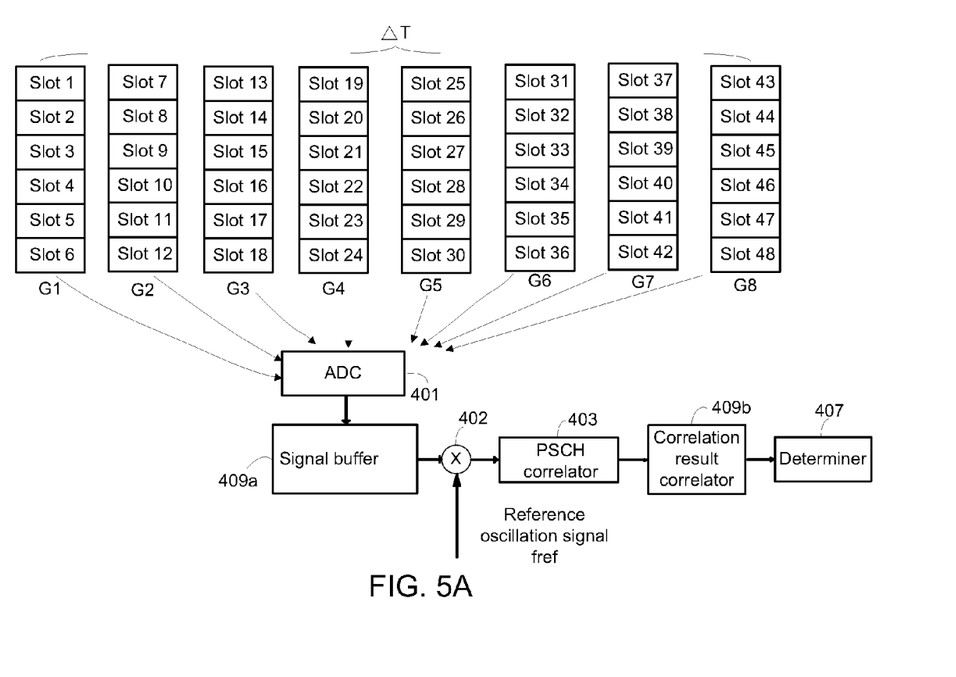
FIG. 5A is schematic diagram of respectively performing a correlation calculation on eight sections divided from a reception signal according to a preferred embodiment of the present invention.

FIG. 5A shows a schematic diagram of respectively performing a correlation calculation on eight sections divided from a reception signal according to a preferred embodiment of the present invention.

In the preferred embodiment, the reception signal is divided into different parts using a clock counter. For example, assuming that the reception signal having a length $\Delta T$ includes 48 slots, the reception signal is divided into eight parts (G1 to G8) each having six slots.

Referring to FIG. 5A, the first-part reception signal G1 includes the slots 1, 2, 3, 4, 5 and 6; the second-part reception signal G2 includes the slots 7, 8, 9, 10, 11 and 12. The slots included in each of the remaining parts can be deduced accordingly, as shown in FIG. 5A. Similarly, in practice, details for dividing the reception signal having the length $\Delta T$ into different parts and the number of the slots included in each part are not limited.

In the preferred embodiment, the first part of the reception signal (the slots 1 to 6) are converted to a digital format by an analog-to-digital converter (ADC) 401 and stored in a signal buffer 409a. A mixer 402 frequency shifts the first part of the reception signal according to a reference oscillation signal $f_{ref}$ to obtain a plurality of first part frequency shifted signals corresponding to the 23 sweep frequencies. A primary synchronization channel (PSCH) correlation calculation is performed on the first part frequency shifted signals by a PSCH correlator 403 to correspondingly obtain a first part correlation result Cor_g1. The first part correlation result Cor_g1 is stored in a calculation result buffer 409b.

After completing the frequency shifting and correlation calculation on the first-part received signal G1 and storing the first part correlation result Cor_g1 in the calculation result buffer 409b, the receiving terminal also performs the similar operations on the second-part reception signal G2.

More specifically, the receiving terminal stores the slots 7 to 12 (substantially equal to the second part of the reception signal) converted to a digital format in the signal buffer 409a, and frequency shifts the slots 7 to 12 according to the 23 different sweep frequencies to obtain a plurality of second part frequency shifted signals. Accordingly, the correlation calculation is performed by the PSCH correlator 403 to obtain a second part correlation result Cor_g2 corresponding to the second-part reception signal G2.

In the preferred embodiment, it is assumed that the 48 slots are divided into eight parts. Thus, the foregoing process is repeated eight times to obtain in eight correlation results (Cor_g1, Cor_g2, Cor_g3, Cor_g4, Cor_g5, Cor_g6, Cor_g7 and Cor_g8).

An accumulation operation is performed according to the eight correlation results, and the frequency difference is estimated according to the accumulation result. Further, as the eight correlation results correspond to the 23 sweep frequencies, the maximum correlation result is identified from the eight correlation results, and the sweep frequency corresponding to the maximum correlation result is utilized as an estimation result of the frequency difference.

It is known from the foregoing description that, the preferred embodiment in FIG. 5A, instead of requiring a storage space sufficient for storing 48 slots, can be implemented by two smaller buffers (the signal buffer 409a and the calculation result buffer 409b).

Figure 5B:
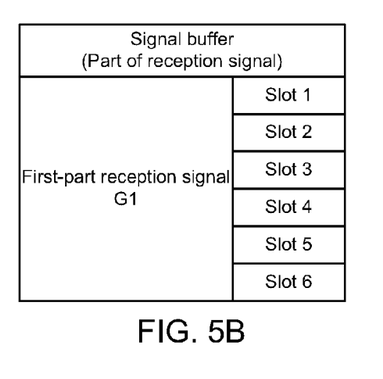
FIG. 5B is a schematic diagram of a signal buffer in the embodiment in FIG. 5A utilized for storing a first part of the reception signal.

FIG. 5B shows a schematic diagram of a signal buffer in the embodiment in FIG. 5A for storing the first part of the reception signal. The signal buffer 409a first stores the reception signal of the slots 1 to 6, and respectively stores the second part of the reception signal after the first part of the reception signal has been processed by the subsequent operations. Further, after the second part of the reception signal has been processed by the subsequent operations, the signal buffer 409a respectively stores the third part of the reception signal, and so forth.

With the above approach, the signal buffer 409a may be repeatedly utilized for storing different parts of the reception signal, and so only a smaller storage space is required. Similarly, assuming that each chip is sampled twice, and an I-branch and a Q-branch of each set of sampled data are respectively 8-bit in length, the buffer size required by the signal buffer 409a is 6*5120*(8+8) bits.

Figure 5C:
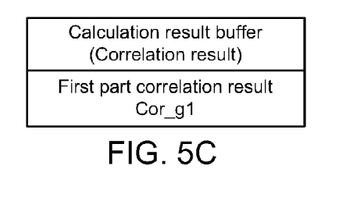
FIG. 5C is a schematic diagram of a calculation result buffer in the preferred embodiment in FIG. 5A utilized for storing a first part correlation result.

FIG. 5C shows a schematic diagram of the calculation result buffer 409b in the preferred embodiment in FIG. 5A utilized for storing the first part correlation result.

As previously stated, the receiving terminal in FIG. 5A respectively performs steps of frequency shifting and correlation calculation on the sweep frequencies for different parts of the received signal. For the first part of the reception signal, the first part correlation result Cor_g1 is correspondingly obtained after the operations. For the second part of the reception signal, the second part correlation result Cor_g2 is correspondingly obtained after the operations, and so forth.

In other words, according to a preferred embodiment of the present invention, the calculation result buffer 409b stores the correlation results (Cor_g1, Cor_g2, Cor_g3, Cor_g4, Cor_g5, Cor_g6, Cor_g7 and Cor_g8) calculated and obtained from different corresponding parts of the reception signal. Thus, after operations of frequency shifting and correlation calculation on the eight parts of the reception signal, data contents stored in the calculation result buffer 409b are as shown in FIG. 5D.

Figure 5D:
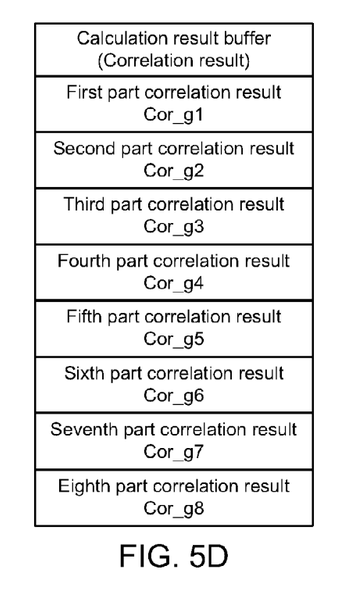
FIG. 5D is a schematic diagram of stored correlation results obtained from performing a correlation calculation on different parts of a reception signal.

FIG. 5D shows a schematic diagram of stored correlation results obtained from performing the correlation calculation on the different parts of the reception signal.

In FIG. 5D, each row represents an independent storage space. Thus, to store the correlation results (Cor_g1, Cor_g2, Cor_g3, Cor_g4, Cor_g5, Cor_g6, Cor_g7 and Cor_g8) corresponding to the eight different parts, the calculation result buffer 409b needs to provide eight buffer spaces.

In the calculation result buffer 409b, the first part buffer space stores the first part correlation result Cor_g1, and the second part buffer space stores the second part correlation result Cor_g2. Similarly, the remaining parts of the calculation result buffer 409b store the correlation results corresponding to the remaining different parts of the reception signal.

With the arrangement of the signal buffer 409a in FIG. 5B and the calculation result buffer 409b in FIG. 5D, in a preferred embodiment of the present invention, an original storage space required for 48 slots can be significantly reduced to a total storage space of the storage space (the signal buffer 409a) required for sixth slots and the storage space (the calculation result buffer 409b) required for the eight correlation results.

Figure 6A:
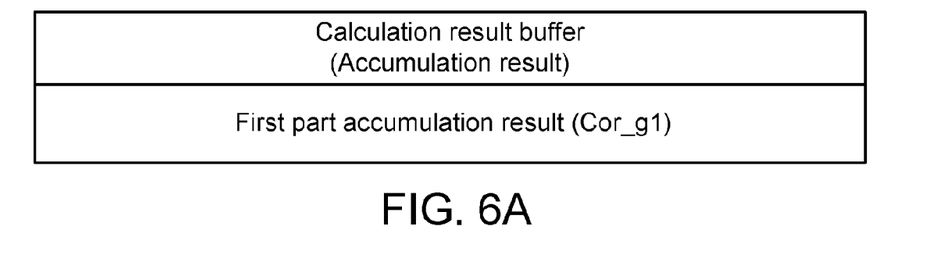
FIG. 6A is a schematic diagram of a calculation result buffer storing a first part accumulation result after processing a first part of a reception signal by frequency shifting and correlation calculation operations.
Figure 6B:
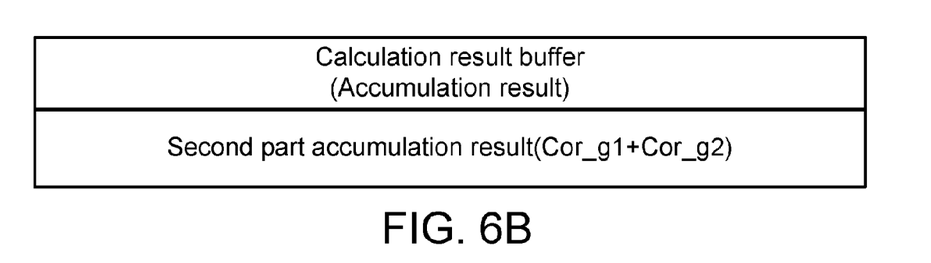
FIG. 6B is a schematic diagram of a calculation result buffer storing a second part accumulation result after processing a second part of a reception signal by frequency shifting and correlation calculation operations.
Figure 6C:
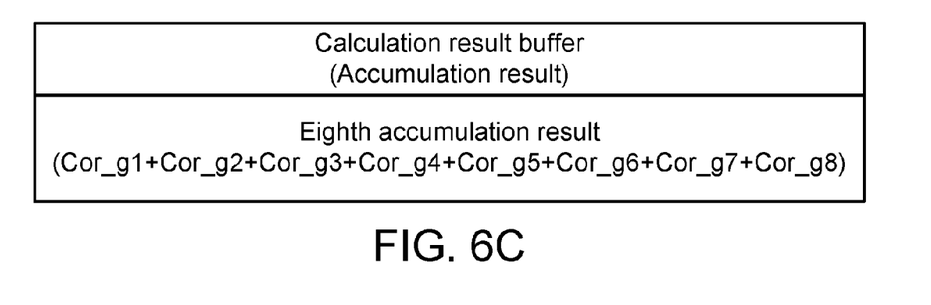
FIG. 6C is a schematic diagram of a calculation result buffer storing an eighth part accumulation result after processing an eighth part of a reception signal by frequency shifting and correlation calculation operations.

A method is provided for the architecture in FIG. 5A by the present invention for further reducing the storage space required by the calculation result buffer 409b. With reference to FIGS. 6A, 6B and 6C, details for storing an accumulation result rather than individual correlation results by the calculation result buffer are described below.

FIG. 6A shows a schematic diagram of the calculation result buffer 409b storing a first part accumulation result after processing the first part of the reception signal by the frequency shifting and correlation calculation operations. In FIG. 6A, the first part accumulation result is substantially equal to the first part correlation result Cor_g1.

FIG. 6B shows a schematic diagram of the calculation result buffer 409b storing a second part accumulation result after processing the second part of the reception signal by the frequency shifting and correlation calculation operations.

In FIG. 6B, after performing the frequency shifting and correlation calculation operations on the second part of the reception signal, the second part correlation result Cor_g2 is accumulated with the first part correlation result Cor_g1 already stored in FIG. 6A to obtain an L number of accumulation results corresponding to an L number of sweep frequencies. The L number of accumulation results are stored back into the calculation result buffer.

Therefore, the second part accumulation result stored in the calculation result buffer at this point is in fact an accumulation of the first part correlation result Cor_g1 and the second part correlation result Cor_g2.

Similarly, after respectively performing the frequency shifting and correlation calculation processes on the other parts of the reception signal, the correlation results obtained are accumulated with the pre-stored accumulation result in the calculation result buffer 409b. The new accumulation result is then updated to the accumulation result in the calculation result buffer 409b. Since the accumulation result is updated as time passes in a way that the original stored contents are read, accumulated and updated, individual storage spaces for storing accumulation results of different parts are no longer required.

FIG. 6C shows a schematic diagram of the calculation result buffer 409b storing the eighth part accumulation result after processing the eighth part of the reception signal by the frequency shifting and correlation calculation operations.

In continuation of the method in FIG. 6B, the eighth part correlation result Cor_g8 is obtained after the eighth part of the reception signal is received and processed by the frequency shifting and correlation calculation operations. The eighth part correlation result Cor_g8 is accumulated with the previously stored seventh part accumulation result (Cor_g1+Cor_g2+Cor_g3+Cor_g4+Cor_g5+Cor_g6+Cor_g7) to obtain the eighth part accumulation result (Cor_g1+Cor_g2+Cor_g3+Cor_g4+Cor_g5+Cor_g6+Cor_g7+Cor_g8).

According to the descriptions associated with FIGS. 6A, 6B and 6C, it is demonstrated that, the storage space for the accumulated correlation result can be repeatedly utilized. Therefore, the storage space for storing the eight buffered correlation results in FIG. 5D can be further simplified to a storage space for storing only one accumulation result.

In conclusion of the foregoing descriptions, the storage space required by the receiving terminal when employing the architecture in FIG. 5A is divided into two parts—the signal buffer 409a and the calculation result buffer 409b. Compared to FIG. 3, when employing the architecture in FIG. 5A, the reception signal within a length of $\Delta T$ can be processed with the same processing speed while also significantly reducing the storage space required.

Figure 7:
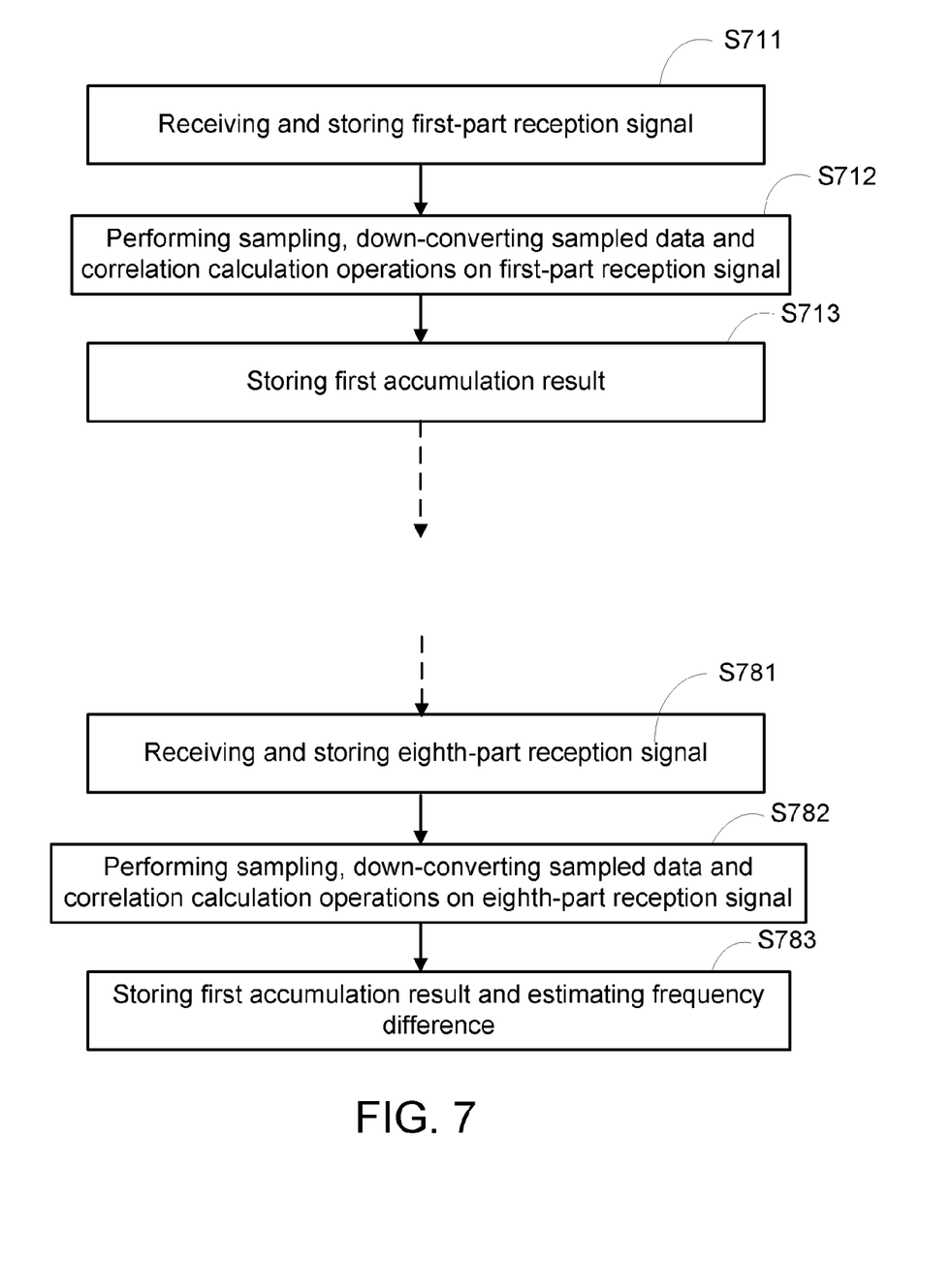
FIG. 7 is a flowchart of estimating a frequency difference of a reception signal based on the architecture in FIG. 5A.

FIG. 7 shows a flowchart of estimating a frequency difference of a reception signal based on the architecture in FIG. 5A. In FIG. 7, reception, storage and calculation processes of the first part and the eighth part of the reception signal are depicted.

The first part of the reception signal is first processed. In step S711, the first part of the reception signal is received and stored. In step S712, the first part of the reception signal is sampled, frequency shifted according to sweep frequencies, and a correlation calculation is performed. In step S713, a first accumulation result is calculated and stored.

The similar process is then performed on other parts of the reception signal.

The eighth part of the reception signal is processed in the end. In step S781, the eighth part of the reception signal is received and stored. In step S782, the eighth part of the reception signal is sampled, frequency shifted according to the sweep frequencies, and the correlation calculation is performed. In step S783, an eighth accumulation result is calculated, and the frequency difference is estimated according to the eighth accumulation result.

It is seen from the flowchart in FIG. 7 that every part of the reception signal undergoes reception, storage, sampling, frequency shifting and correlation calculation operations. As the reception signal is divided into eight parts, the similar process is performed eight times to form a cyclical process.

A method for improving a processing speed for the process in FIG. 7 is further provided according to another preferred embodiment of the present invention. In short, before the foregoing cyclical step, the preferred embodiment determines whether the process can be ended ahead of time to reduce the cycle number of the overall cyclical process.

Figure 8:
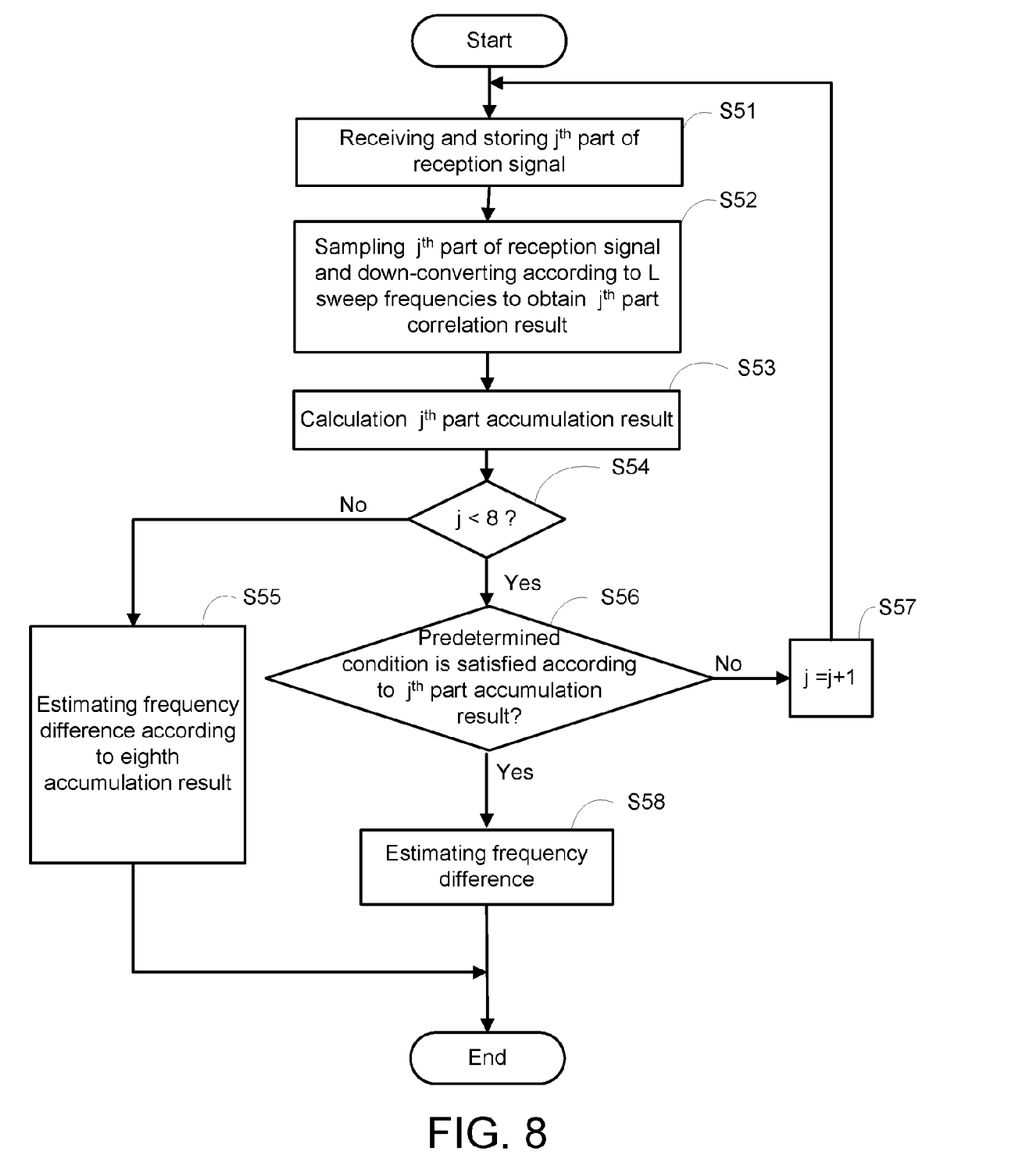
FIG. 8 is a flowchart for further increasing a speed of estimating a frequency difference based on the architecture of FIG. 5A.

FIG. 8 shows a flowchart for further increasing a speed for estimating a frequency difference based on the architecture of FIG. 5A. In the embodiment, it is similarly assumed that a reception signal includes 48 slots, and is divided into eight parts, with j=1 to 8 representing different parts of the reception signal.

In step S51, a $j^{th}$ part of the reception signal is received and stored. In step S52, the $j^{th}$ part of the reception signal is sampled, and the sampled data is frequency shifted according to sweep frequencies f1 to f23 to obtain a $j^{th}$ part correlation result.

In step S53, the $j^{th}$ part correlation result is accumulated, and the accumulation result in the calculation result buffer is updated. As previously stated, this step obtains the $j^{th}$ accumulation result by accumulating the accumulation result of the $j^{th}$ part correlation result with the $(j-1)^{th}$ accumulation result.

In step S54, after obtaining the $j^{th}$ accumulation result, it is determined whether j is smaller than 8. When j=8, the frequency difference is estimated according to the eighth accumulation result, as shown in step S55.

When j<8, in step S56, it is determined whether a predetermined condition is satisfied according to the $j^{th}$ accumulation result. Details of the predetermined condition are described shortly.

In step S58, when the predetermined condition is satisfied, the frequency difference is estimated according to the $j^{th}$ accumulation result, or else the next part of the reception signal is received and the process in FIG. 8 is iterated until j=8.

More specifically, step S58 implies that the frequency difference can be estimated according to a partial accumulation result. In other words, the frequency difference can be estimated without receiving all of the reception signal as the process enters step S58. The method for estimating the frequency difference based on the partial accumulation results is similar to the method for estimating the frequency difference based on all accumulation results. That is, among the $j^{th}$ accumulation results, the sweep frequency corresponding to the maximum accumulation result serves as the estimation result of the frequency difference.

The predetermined condition is to be described below. The $j^{th}$ accumulation result is obtained by performing the frequency shifting, correlation calculation and accumulation operations on the corresponding sweep frequency, and the $j^{th}$ accumulation result includes values corresponding to an L number of frequencies.

Thus, a maximum accumulation result is obtained according to the $j^{th}$ accumulation result, and an accumulation result average also obtained according to the $j^{th}$ accumulation result.

A peak-to-average power ratio (PAPR) is obtained according to the maximum accumulation result and the accumulation result average. The predetermined condition is satisfied when the PAPR is greater than a ratio threshold.

When the $j^{th}$ accumulation result satisfies the predetermined condition, operations on subsequent slot groups can be omitted. According to the preferred embodiment of the present invention, during the process of signal reception, not all reception signals of 48 slots need to be fully received to determine the correct sweep frequency.

In fact, during the reception process, the overall estimation process may be ended ahead of time when the frequency difference can be estimated according to the parts of the reception signal of earlier time points.

For example, when the third accumulation result satisfies the predetermined condition, the fourth, fifth, sixth, seventh and eighth parts of the reception signal need not be received, which is in equivalence completing the estimation for the frequency difference by spending ⅜ of the original time.

Figure 9A:
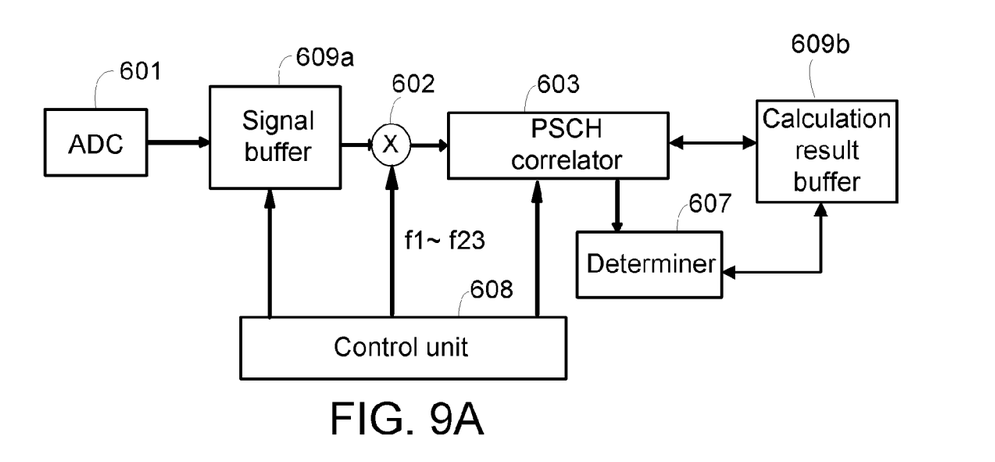
FIG. 9A is a block diagram of an apparatus for estimating a frequency difference of a reception terminal and capable of satisfying both processing time and storage space requirements according to a preferred embodiment of the present invention.

FIG. 9A shows a block diagram of an apparatus for estimating a frequency difference of a reception terminal. The apparatus is capable of satisfying both processing time and storage space requirements. An analog-to-digital converter (ADC) 601 converts the reception signal to a digital format, and stores the digitized reception signal to a signal buffer 609a. A control unit 608 provides sweep frequencies f1 to f23 to a mixer 602, which then frequency shifts the reception signal according to the sweep frequencies f1 to f23. After the frequency shifting operation performed by the mixer 602, a PSCH correlator 603 performs a correlation calculation on the frequency-shifted reception signal.

After the correlation calculation performed by the PSCH correlator 603, a determiner 607 determines whether a predetermined condition is established according to a latest calculation result. The determination process for coarse frequency correction ends when the predetermined condition is established. When the predetermined condition is not established, the current calculation result is stored to a calculation result buffer 609b for the use of subsequent stages.

Details for reducing a time for estimating a frequency difference through a pipelined process according to a preferred embodiment of the present invention are described below.

Figure 9B:
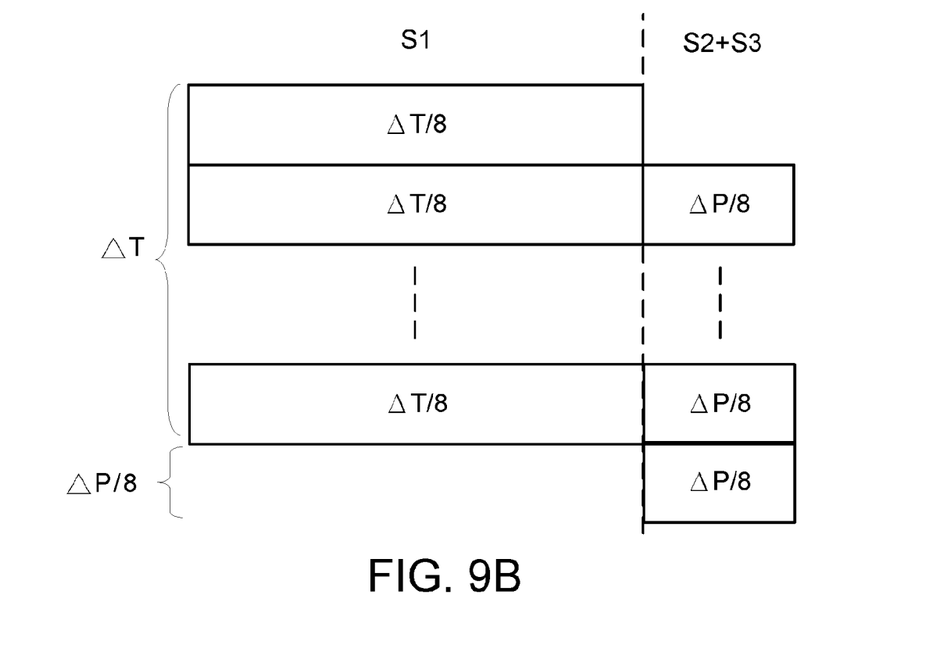
FIG. 9B is a schematic diagram of a pipelined approach for enhancing an estimation method of the system architecture in FIG. 9A.

FIG. 9B shows a schematic diagram of a pipelined approach for enhancing an estimation method of the system architecture in FIG. 9A.

In conclusion of the above descriptions, in addition to dividing the reception signal into different parts, different parts of the reception signal may be processed by three processing steps.

In the first step S1, the ADC 601 and the signal buffer 609a respectively convert the received signal to a digital format and store the digitized received signal. In the second step S2, a frequency-shift operation and a correlation calculation are respectively performed on the digitized received signal by the control unit 608, the PSCH correlator 603 and the determiner 607. In the third step S3, the calculation buffer 609b stores the accumulation result.

By further analyzing the three processing steps, it is discovered that, the first processing step, chiefly for receiving and storing the reception signal, consumes a longer processing time. Further, elements utilized by the reception terminal for performing the second processing and the third processing step are different from the element utilized for performing the first processing step.

According to a concept of pipelining, when the first part of the reception signal is completely processed by the ADC and the reception signal buffer, the processed first part of the reception signal is handed over to the subsequent control unit, mixer, PSCH correlator, determiner and calculation result buffer for performing the second and third processing steps.

In the foregoing preferred embodiment, when performing the second and third processing steps on the first part of the reception signal, the ADC and the reception signal buffer are at an idle state, and only become active to receive and store the second part of the reception signal once it is confirmed that the predetermined condition is not satisfied.

However, in a pipelined architecture, the ADC and the reception signal buffer, instead of being left idle, immediately receive and store the second part of the reception signal. That is to say, while the second and third processing steps perform the sampling, frequency shifting and correlation calculation operations on the $j^{th}$ part of the reception signal, the first processing step may at the same time perform format conversion on the $(j+1)^{th}$ part of the reception signal and store the converted $(j+1)^{th}$ part of the reception signal.

It is observed from FIG. 9B, assuming that the coarse frequency correction is confirmed when having reached the eighth stage of sampled data, the processing time required by the pipelined approach for data processing is $8*(\Delta T/8)+\Delta P/8 = \Delta T + \Delta P/8$.

Being associated with a hardware processing speed, the second and third processing steps are relatively faster. Therefore, $\Delta T/8$ is much greater than $\Delta P/8$. In practice, $\Delta T$ may be further divided into more sections. That is to say, upon receiving the reception signal of a shorter time length, the reception signal is immediately processed (the second and third processing steps).

Figure 9C:
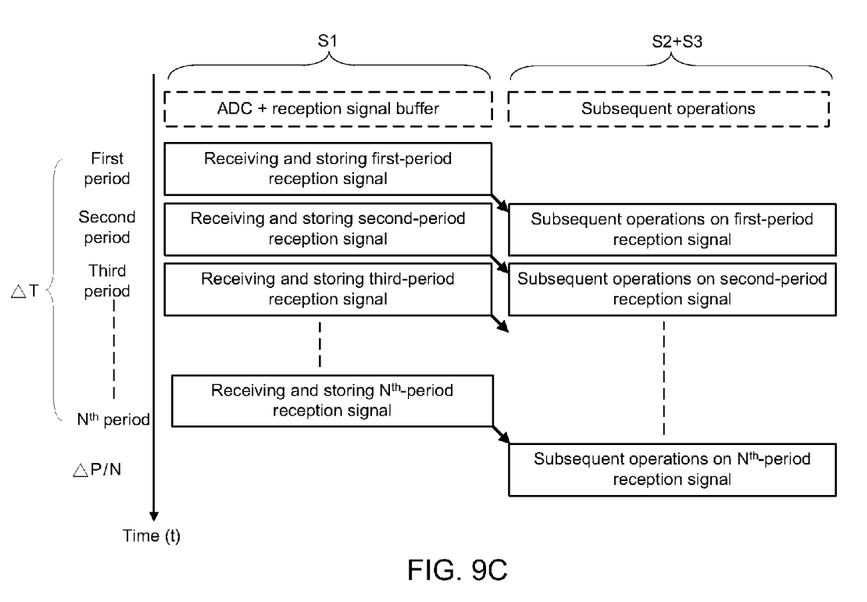
FIG. 9C is a schematic diagram of frequency estimation using pipelined scheduling after dividing a reception signal into an N number of parts.

FIG. 9C shows a schematic diagram of frequency estimation using pipelined scheduling after dividing the reception signal into an N number of parts. In FIG. 9C, the pipelined scheduling renders a processing time of the first step S1 to be equal to a total processing time of the second and third processing steps S2 and S3, thereby enhancing the efficiency of the pipelined scheduling.

In FIG. 9C, it is assumed that the reception signal is divided into an N number of parts, each having a length of ΔT/N. Further, a first phase of the operations performed by the ADC and the reception signal buffer are regarded as the first processing step S1, and a second phase of the operations that follow and being performed by the remaining elements is regarded as the second processing step S2 and the third processing step S3. To optimize the pipelined scheduling, it is also assumed that the processing time of the first phase equals the processing time of the second phase.

In a first period, the ADC and the reception signal buffer receive and store a first-period (first-part) reception signal.

In a second period, the ADC and the reception signal buffer receive and store a second-period (second-part) reception signal. Also in the second period, the first-period reception signal stored previously is processed by the control unit, the PSCH correlator and the determiner in subsequent operations.

The similar process is repeated until reaching an $N^{th}$ period. In the $N^{th}$ period, the ADC and the reception signal buffer receive and store an $N^{th}$-period (second-part) reception signal. Also in the $N^{th}$ period, the $(N-1)^{th}$-period reception signal previously stored is processed by the control unit, the PSCH correlator and the determiner in subsequent operations.

After the N number of periods, the frequency difference is estimated by a period of ΔP/N. It should be noted that, based on the foregoing descriptions, when the parts of the reception signal at earlier time points are sufficient for determining the frequency difference, the time in FIG. 9C is no longer required.

Thus, from FIG. 9C, it is inferred that under worse conditions, a total time required is $N*(\Delta T/N)+\Delta P/N=\Delta T+\Delta P/N$.

In conclusion, the concept of the present invention is summarized as the steps of: in a first period, receiving and storing a first part of the reception signal; in a second period, frequency shifting the first part of the reception signal according to an L number of sweep frequencies to obtain a plurality of first part frequency-shifted signals corresponding to the L number of sweep frequencies, where L is a positive integer; performing a correlation calculation on the first part frequency-shifted signals to obtain a plurality of first part correlation results; in the second period, receiving and storing a second part of the reception signal; in a third period, frequency shifting the second part of the reception signal according to the L number of sweep frequencies to obtain a plurality of second part frequency-shifted signals corresponding to the L number of sweep frequencies; performing the correlation calculation on the second part frequency-shifted signals to obtain a plurality of second part correlation results; and estimating the frequency difference according to the first part correlation results and the second part correlation results.

To further increase the processing speed, the pipelined scheduling may further cooperate with a parallel process. For example, two same-sized storage spaces (a first storage space and a second storage space) are provided in the reception signal buffer. The first storage space stores odd-number reception signals, and the second storage space stores even-number reception signals.

For example, when storing the second part of the reception signal converted to a digital format to the second storage space, the control unit accesses the first part of the reception signal previously stored in the first storage space. Similarly, when the ADC stores the third part of the reception signal converted to a digital format to the first storage space, the control unit accesses the second part of the reception signal previously stored in the second storage space.

Thus, the process of storing the new reception signal is unaffected when the control unit needs to access the reception signal from the signal buffer.

According to a preferred embodiment of the present invention, utilization rates of the calculation result buffer 409b and 609b are not high, and can thus be implemented by less costly external memories.

An external memory features a large capacity but limited read/write operations, meaning that the external memory, rather than being ready for random accesses as desired, can only be accessed by burst read/write operations. Further, an external memory is usually shared by other peripheral devices.

According to a preferred embodiment of the present invention, during a public land mobile network (PLMN) search, a designated/accessible memory space is larger when a cell phone system is freshly booted as other peripherals do not require the memory space. Thus, when implementing an external memory, system development costs are not increased for that an existing memory space can be employed.

Further, since the calculation result buffer 409b only stores the accumulation result after all the parts of the reception signal are calculated, the speed of an external memory is satisfactory. In other words, in addition to increasing the processing speed, a size of an internal memory space demanded in the present invention is also reduced for satisfying both targets of reduced costs and an increased processing speed.

It should be noted that, although an example of a primary synchronization sequence of a WCDMA system is given for explaining details for increasing a speed of frequency correction in the foregoing descriptions, the concept of the present invention is not limited to applications of a WCDMA system.

In practice, given that the reception signal is a designed sequence having an auto-correlation property, the concept of the present invention is applicable to other types of communication systems.

For example, a digital television system employs a quadrature phase shift keying (QPSK) modulation for signal transmission. Such modulation also needs to first perform frequency correction in order to properly transmit digital television signals. Alternatively, for other types of mobile communications, the speed of frequency correction can also be enhanced according to the above concept.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for estimating a frequency difference between a transmission terminal and a reception terminal according to a reception signal, comprising:

in a first period, receiving and storing a first part of the reception signal;

in a second period, frequency shifting the first part of the reception signal according to an L number of sweep frequencies to obtain a plurality of first part frequency-shifted signals corresponding to the L number of sweep frequencies, where L is a positive integer;

performing a correlation calculation on the first part frequency-shifted signals to obtain a plurality of first part correlation results;

in the second period, receiving and storing a second part of the reception signal;

in a third period, frequency shifting the second part of the reception signal according to the L number of sweep frequencies to obtain a plurality of second part frequency-shifted signals corresponding to the L number of sweep frequencies;

performing the correlation calculation on the second part frequency-shifted signals to obtain a plurality of second part correlation results; and estimating the frequency difference according to the first part correlation results and the second part correlation results;

wherein said frequency difference is estimated according to a partial accumulation result;

wherein in the third period, the step of frequency shifting the second part of the reception signal according to the L number of sweep frequencies to obtain the second part frequency-shifted signals corresponding to the L number of sweep frequencies comprises:

sampling the second part of the reception signal to obtain a K number of sets of sampled data, where K is a positive integer; and frequency shifting the K number of sets of sampled data according to the L number of sweep frequencies to obtain the second part frequency-shifted signals, respectively; and wherein the step of estimating the frequency difference according to the first part correlation results and the second part correlation results comprises:

for the L number of sweep frequencies, obtaining an L number of accumulation results corresponding to the sweep frequencies by accumulating the first part correlation results and the second part correlation results;

obtaining a maximum accumulation result by comparing the accumulation results;

obtaining an accumulation result average according to the accumulation results; and obtaining the frequency difference according to the maximum accumulation result and the accumulation result average.

2. The method according to claim 1, wherein the step of obtaining the frequency difference according to the maximum accumulation result and the accumulation result average utilizes the sweep frequency corresponding to the maximum accumulation result as the frequency difference when the maximum accumulation result and the accumulation result average satisfy a predetermined condition.

3. The method according to claim 2, wherein the predetermined condition is when a ratio of the maximum accumulation result to the accumulation result average is greater than a ratio threshold.

4. The method according to claim 1, wherein the first period, the second period and the third period are equal in time length.

5. A method for estimating a frequency difference between a transmission terminal and a reception terminal according to a reception signal, comprising:

in a first period, receiving and storing a first part of the reception signal;

in a second period, frequency shifting the first part of the reception signal according to an L number of sweep frequencies to obtain a plurality of first part frequency-shifted signals corresponding to the L number of sweep frequencies, where L is a positive integer;

performing a correlation calculation on the first part frequency-shifted signals to obtain a plurality of first part correlation results;

in the second period, receiving and storing a second part of the reception signal;

in a third period, frequency shifting the second part of the reception signal according to the L number of sweep frequencies to obtain a plurality of second part frequency-shifted signals corresponding to the L number of sweep frequencies;

performing the correlation calculation on the second part frequency-shifted signals to obtain a plurality of second part correlation results; and estimating the frequency difference according to the first part correlation results and the second part correlation results;

wherein in the third period, the step of frequency shifting the second part of the reception signal according to the L number of sweep frequencies to obtain the second part frequency-shifted signals corresponding to the L number of sweep frequencies comprises:

sampling the second part of the reception signal to obtain a K number of sets of sampled data, where K is a positive integer; and frequency shifting the K number of sets of sampled data according to the L number of sweep frequencies to obtain the second part frequency-shifted signals, respectively; and wherein the step of estimating the frequency difference according to the first part correlation results and the second part correlation results comprises:

for the L number of sweep frequencies, obtaining an L number of accumulation results corresponding to the sweep frequencies by accumulating the first part correlation results and the second part correlation results;

obtaining a maximum accumulation result by comparing the accumulation results;

obtaining an accumulation result average according to the accumulation results; and obtaining the frequency difference according to the maximum accumulation result and the accumulation result average.

* * * * *